United States Patent
Kubotani et al.

(10) Patent No.: US 11,267,458 B2
(45) Date of Patent: Mar. 8, 2022

(54) INDUSTRIAL VEHICLE

(71) Applicant: KABUSHIKI KAISHA TOYOTA JIDOSHOKKI, Kariya (JP)

(72) Inventors: Takehiro Kubotani, Aichi-ken (JP); Norihiko Kato, Aichi-ken (JP); Hitoshi Fukuoka, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 202 days.

(21) Appl. No.: 15/834,136

(22) Filed: Dec. 7, 2017

(65) Prior Publication Data

US 2018/0162383 A1 Jun. 14, 2018

(30) Foreign Application Priority Data

Dec. 8, 2016 (JP) .............................. JP2016-238824

(51) Int. Cl.
*B60W 30/04* (2006.01)
*B60G 17/005* (2006.01)
(Continued)

(52) U.S. Cl.
CPC ........... *B60W 30/04* (2013.01); *B60G 17/005* (2013.01); *B60G 17/0162* (2013.01);
(Continued)

(58) Field of Classification Search
CPC ........... B60W 30/04; B60W 2300/121; B60W 2520/06; B60W 2720/12; B66F 9/07568
(Continued)

(56) References Cited

U.S. PATENT DOCUMENTS 5,947,516 A 9/1999 Ishikawa
6,082,742 A 7/2000 Ishikawa
(Continued)

FOREIGN PATENT DOCUMENTS

| JP | 10-338011 A | 12/1998 |
|---|---|---|
| JP | 3129259 B2 | 11/2000 |
| JP | 2005-096894 A | 4/2005 |

OTHER PUBLICATIONS

Communication dated Feb. 26, 2020, from the Japanese Patent Office in Application No. 2016-238824.
(Continued)

*Primary Examiner* — Khoi H Tran
*Assistant Examiner* — Rodney P King
(74) *Attorney, Agent, or Firm* — Sughrue Mion, PLLC (57) ABSTRACT

An industrial vehicle includes a body, an axle pivotally supported by the body, a lateral acceleration sensor determining lateral acceleration applied to the body when the industrial vehicle is turned, an actuator temporally restricting pivoting of the axle while the industrial vehicle is being turned, a vehicle speed limiter limiting traveling speed of the industrial vehicle when the industrial vehicle is turned, and a controller driving the actuator based on the lateral acceleration determined by the lateral acceleration sensor to temporally restrict pivoting of the axle and to limit traveling speed of the industrial vehicle based on the lateral acceleration. In the controller a first lateral acceleration threshold value which is used in judging whether traveling speed of the industrial vehicle should be limited is set larger than a second lateral acceleration threshold value which is used in judging whether pivoting of the axle should be temporally restricted.

4 Claims, 9 Drawing Sheets

(51) Int. Cl.
  *B60G 17/016* (2006.01)
  *B66F 17/00* (2006.01)
  *B66F 9/075* (2006.01)
  *B60W 30/14* (2006.01)

(52) U.S. Cl.
  CPC ....... *B60W 30/146* (2013.01); *B66F 9/07586* (2013.01); *B66F 17/003* (2013.01); *B60G 2200/322* (2013.01); *B60G 2204/4605* (2013.01); *B60G 2300/022* (2013.01); *B60G 2400/0523* (2013.01); *B60G 2400/204* (2013.01); *B60G 2400/95* (2013.01); *B60G 2800/0124* (2013.01); *B60W 2300/121* (2013.01); *B60W 2520/06* (2013.01); *B60W 2520/10* (2013.01); *B60W 2520/12* (2013.01); *B60W 2520/125* (2013.01); *B60W 2520/14* (2013.01); *B60W 2720/12* (2013.01); *B60Y 2200/15* (2013.01); *B66F 9/07568* (2013.01); *B66F 9/07572* (2013.01)

(58) Field of Classification Search
  USPC .......................................................... 701/50
  See application file for complete search history.

(56) References Cited

U.S. PATENT DOCUMENTS

| 6,175,796 | B1 | 1/2001 | Ishikawa | |
| 6,266,594 | B1* | 7/2001 | Ishikawa | B60G 17/005 |
| | | | | 701/50 |
| 8,862,303 | B2* | 10/2014 | Kubotani | B60L 15/20 |
| | | | | 701/22 |
| 9,057,437 | B2* | 6/2015 | Kaneko | B66F 9/22 |
| 2009/0018744 | A1* | 1/2009 | Abe | B60K 31/0066 |
| | | | | 701/93 |
| 2013/0166101 | A1* | 6/2013 | Noumura | B60W 10/06 |
| | | | | 701/1 |
| 2015/0090507 | A1* | 4/2015 | Okada | B66F 9/07568 |
| | | | | 180/65.51 |

OTHER PUBLICATIONS

Communication dated Mar. 6, 2020, from the Intellectual Property India Patent Office in Indian Application No. 201744043344.

* cited by examiner

FIG. 4A  VEHICLE SPEED

FIG. 4B  LATERAL ACCELERATION

FIG. 4C  SWING LOCK COMMAND

FIG. 4D  VEHICLE SPEED LIMIT COMMAND

FIG. 4E  VEHICLE SPEED RECOVERY FLAG

FIG. 7A VEHICLE SPEED

FIG. 7B LATERAL ACCELERATION

FIG. 7C SWING LOCK COMMAND

FIG. 7D VEHICLE SPEED LIMIT COMMAND

FIG. 7E VEHICLE SPEED RECOVERY FLAG

FIG. 8A VEHICLE SPEED

FIG. 8B
LATERAL ACCELERATION

FIG. 8C
SWING LOCK COMMAND

FIG. 8D
VEHICLE SPEED LIMIT COMMAND

FIG. 8E
VEHICLE SPEED RECOVERY FLAG

FIG. 9A VEHICLE SPEED

FIG. 9B

LATERAL ACCELERATION

THRESHOLD VALUE

FIG. 9C

VEHICLE SPEED LIMIT COMMAND

FIG. 9D

SWING LOCK COMMAND $\tau$. TIME LAG

INDUSTRIAL VEHICLE

BACKGROUND OF THE INVENTION

The present invention relates to an industrial vehicle such as a forklift truck.

Japanese Patent No. 3129259 discloses an industrial vehicle in which an axle is pivotally supported by the vehicle body and the pivotal motion of the axle may be restricted. The pivoting of the axle of the vehicle is temporarily restricted while the vehicle is being turned by steering according to a limit value set for the yaw acceleration occurring when the vehicle is turned, so that the industrial vehicle can restrict the tilting of the body thereby to allow the vehicle to travel stably. Japanese Patent Application Publication No. 2005-96894 discloses an industrial vehicle is operable to select either of the limit mode in which the vehicle traveling speed is limited based on the condition of turning of the vehicle and the gravity center height of the vehicle and the non-limit mode in which the vehicle traveling speed is not limited.

It is conceivable to combine the disclosure of Japanese Patent No. 3129259 regarding the swing lock function to temporarily restrict the pivoting of the axle while the industrial vehicle is being turned by steering and the disclosure of the Japanese Patent Application Publication No. 2005-96894 regarding the vehicle speed limiting function to limit the vehicle speed depending on the vehicle conditions. In the case of an industrial vehicle having the combination of such two functions, there arises a problem of interference between the swing lock control and the vehicle speed limiting control when the swing lock threshold value to temporarily restrict the pivoting of the axle while the vehicle is being turned and the threshold value to limit vehicle speed are set at the same value so as to ensure lateral stability of the vehicle. As an example of the control interference, in a vehicle having an electromagnetic solenoid which is used as an actuator for temporally restricting the pivoting of the axle while the vehicle is being turned, an operator of the vehicle may experience an uncomfortable feel due to a time lag T of the actuator as shown in FIGS. 9A through 9D, that is, due to the time lag T occurring between the time when command signal is generated and the time when the restriction of the pivoting motion of the axle and the vehicle speed limiting are actually effected. The operator of the vehicle feels that this time lag T is uncomfortable.

The present invention is directed to providing an industrial vehicle that can be turned smoothly and stably so as to free an operator of the vehicle from uncomfortable feel when the industrial vehicle is turned.

SUMMARY OF THE INVENTION

In accordance with a first aspect of the present invention, there is provided an industrial vehicle includes a body, an axle pivotally supported by the body, a lateral acceleration sensor determining lateral acceleration applied to the body when the industrial vehicle is turned, an actuator temporally restricting pivoting of the axle while the industrial vehicle is being turned, a vehicle speed limiter limiting traveling speed when the industrial vehicle is turned, and a controller driving the actuator based on the lateral acceleration determined by the lateral acceleration sensor to temporally restrict pivoting of the axle while the industrial vehicle is being turned and to limit traveling speed of the industrial vehicle by the vehicle speed limiter based on the lateral acceleration when the industrial vehicle is turned. In the controller, a first lateral acceleration threshold value which is used in judging whether traveling speed of the industrial vehicle should be limited is set larger than a second lateral acceleration threshold value which is used in judging whether pivoting of the axle should be temporally restricted.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the embodiments together with the accompanying drawings in which:

FIGS. 8A, 8B, 8C, 8D and 8E are various time charts illustrating the operation of another example of the forklift truck of FIG. 1, showing the vehicle speed, the lateral acceleration, the swing lock on-off command, and the vehicle speed limit on-off command, respectively to illustrate another manner of operation of the forklift truck of FIG. 1.

DETAILED DESCRIPTION OF THE EMBODIMENTS

Figure 1:
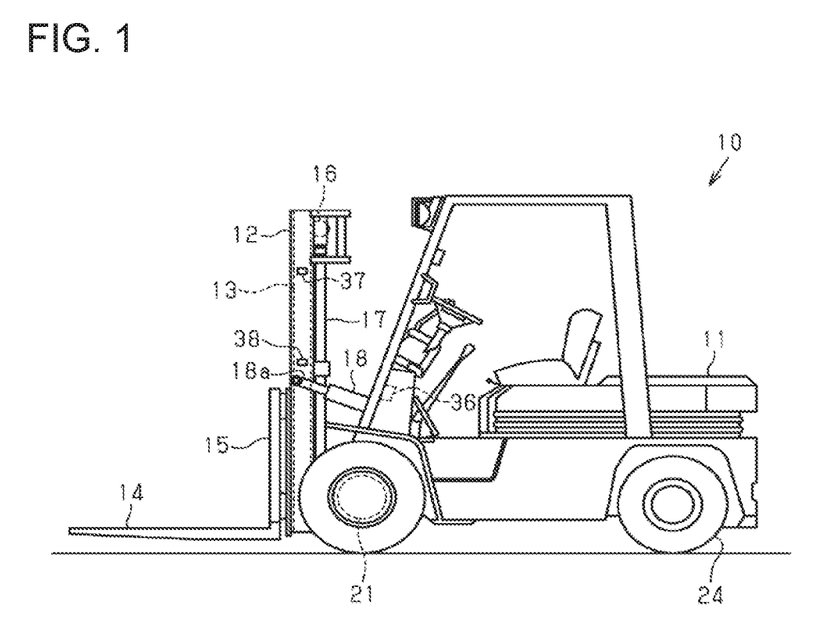
FIG. 1 is a side view showing a forklift truck according to an embodiment of the present invention.

The following will describe a forklift truck as an industrial vehicle according to an embodiment of the present invention with reference to accompanying the drawings. Referring to FIG. 1, the forklift truck which is designated generally by reference numeral 10 is a front drive, rear steering, four-wheel vehicle. The forklift truck 10 includes a body 11 and an outer mast 12 the lower end of which is mounted to the front of the body 11 and that is tiltable toward the front and the rear. The outer mast 12 supports inner masts 13 such that the inner masts 13 can be elevated and lowered. The inner masts 13 support a lift bracket 15, to which forks 14 are fixed, such that the lift bracket 15 can be elevated and lowered. A sprocket wheel 16 is mounted to the upper part of the inner mast 13 and a chain (not shown) is provided to connect the sprocket wheel 16 and the lift bracket 15.

A lift cylinder 17 is arranged behind the outer mast 12 and has a piston rod (not shown) that is connected to the upper portion of its corresponding inner mast 13. A tilt cylinder 18 is arranged at the front portion of the body 11 and has a piston rod 18a that is connected to the outer mast 12.

Figure 2:
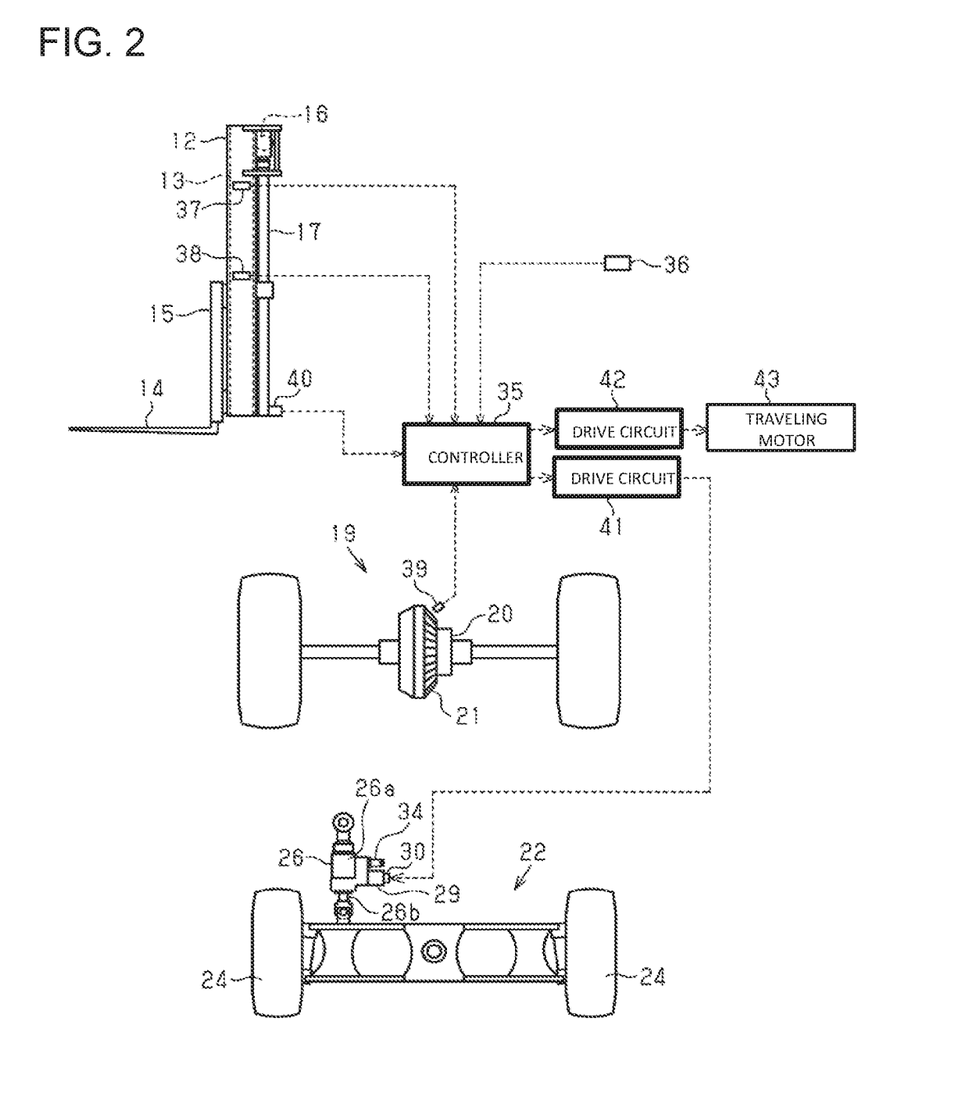
FIG. 2 is a diagrammatic view showing front and rear axles of the forklift truck of FIG. 1.
Figure 3:
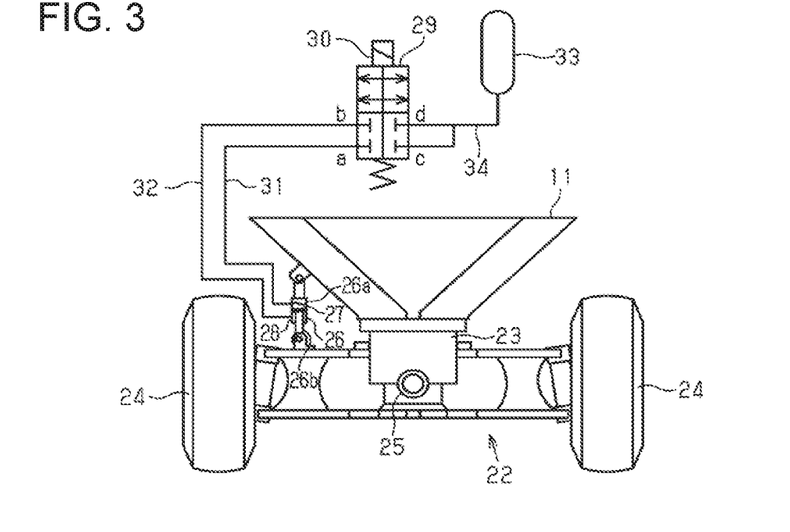
FIG. 3 is a diagrammatic view showing a vehicle body and the rear axle of the forklift truck of FIG. 1.

Referring to FIG. 2, there is shown a front axle 19 that includes a differential device accommodated in a differential case 20. A ring gear 21 is fixed to the differential case 20. Referring to FIG. 3, an axle support member 23 is provided in the lower part of the body 11 to support a rear axle 22. The rear axle 22 includes a rocking shaft 25 and has at the opposite ends thereof steerable rear wheels 24. The axle support member 23 supports the rocking shaft 25 rotatably so that the rear axle 22 is supported pivotally with respect to the body 11. That is, the rear wheels 24 are swingable up and down.

A dual-action type hydraulic cylinder 26 is provided between the body 11 and the rear axle 22 to temporally restrict the pivoting motion of the rear axle 22 while the forklift truck 10 is being turned. The hydraulic cylinder 26 serving as a swing lock cylinder has a cylinder tube 26a that is pivotally connected at one end thereof to the body 11. The hydraulic cylinder 26 also has a piston rod 26b that is connected to the rear axle 22.

The hydraulic cylinder 26 has a first oil chamber 27 provided on the piston head side and a second oil chamber 28 provided on the side of the piston rod 26b that are formed integrally with the hydraulic cylinder 26. The first oil chamber 27 and the second oil chamber 28 are connected to or disconnected from each other by a solenoid-operated valve 29 having an electromagnetic solenoid 30.

The valve 29 is a four-port two-way switching valve having ports a, b, c, d. The valve 29 has therein a spool (not shown). The solenoid 30 shifts the spool between the connection position and the disconnection position. In the connection position of the valve 29 with the solenoid 30 energized, the spool connects the port a to the port c and the port b to the port d, respectively. In the disconnection position of the valve 29 with the solenoid 30 deenergized, the spool disconnects the associated ports a, c and b, d from each other. The valve 29 is normally closed, so that when the solenoid 30 is deenergized, the spool is shifted to the disconnection position by a spring (not shown).

The first oil chamber 27 is connected to the port a through a passage 31, while the second oil chamber 28 is connected to the port b through a passage 32. A passage 34 connects the ports c, d to an accumulator 33 that is formed integrally with the hydraulic cylinder 26. When the solenoid 30 is energized, the hydraulic cylinder 26 is fixed through the valve 29, so that the rear axle 22 is locked so as not to move up and down and the up-down swing of the rear wheels 24 is prevented. As a result, the pivoting of the rear axle 22 is temporally restricted while the forklift truck 10 is being turned.

In the forklift truck 10 as an industrial vehicle, the rear axle 22 is pivotally supported by the body 11. The pivoting motion of the rear axle 22 can be restricted. Referring to FIG. 2, a controller 35 is mounted on the body 11. The controller 35 includes a microcomputer and controls to restrict the pivoting motion of the rear axle 22 while the forklift truck 10 is being turned and to limit the vehicle traveling speed.

A yaw rate sensor 36, a first height sensor 37, a second height sensor 38, a vehicle speed sensor 39, and a load sensor 40 are electrically connected to the input of the controller 35. The controller 35 determines the yaw rate, the vehicle speed and the load based on detection signals sent from the yaw rate sensor 36, the vehicle speed sensor 39, and the load sensor 40, respectively. The controller further determines the first height position signal and the second height position signal based on the first height sensor 37 and the second height sensor 38, respectively to determine whether the fork 14 (lift bracket 13) is at higher fork height or at lower fork height.

The controller 35 determines the lateral acceleration (lateral G) applied to the body 11 when the forklift truck 10 is turned based on the detection signal from the yaw rate sensor 36. In the present embodiment, the yaw rate sensor 36 and the controller 35 serving as lateral acceleration sensor of the present invention determine the lateral acceleration applied to the body 11 when the forklift truck 10 is turned.

Drive circuits 41, 42 are electrically connected to the controller 35. The controller 35 drives the solenoid 30 corresponding to actuator of the present invention to restrict the pivoting of the rear axle 22 via the drive circuit 41 so as to temporally restrict the pivoting of the rear axle 22 while the forklift truck 10 is being turned. As a result, the tilting of the body 11 is suppressed and, therefore, the stability of the vehicle is ensured. The controller 35 further controls a traveling motor 43 via the drive circuit 42 so as to limit the vehicle traveling speed when the forklift truck 10 is turned. That is, the controller 35 corresponds to vehicle speed limiter to limit the vehicle traveling speed when the forklift truck 10 is turned.

The following will describe the operation of the forklift truck 10. Referring to FIGS. 4A, 4B, 4C, 4D, and 4E, the time charts illustrate the vehicle speed, the lateral acceleration, the swing lock on-off command for temporally restricting the pivoting of the rear axle 22 while the forklift truck 10 is being turned, the vehicle speed limit on-off command, and the vehicle speed recovery flag, respectively.

The controller 35 drives the solenoid 30 based on the measured lateral acceleration so as to temporally restrict the pivoting of the rear axle 22 while the forklift truck 10 is being turned and also controls the traveling motor 43 based on the lateral acceleration so as to limit the vehicle traveling speed when the forklift truck 10 is turned.

Figure 4A:
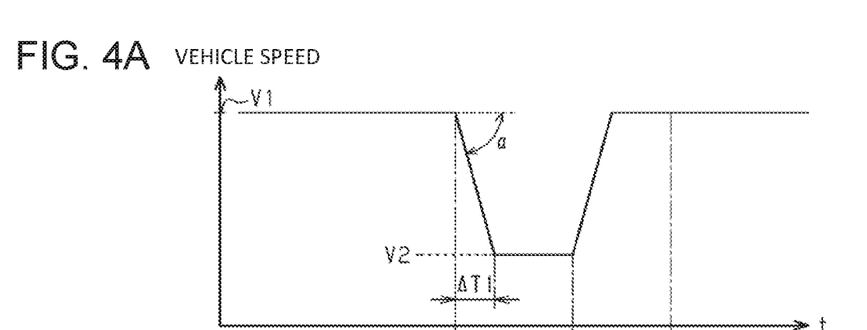
FIGS. 4A, 4B, 4C, 4D, and 4E are various time charts, showing the vehicle speed, the lateral acceleration, the swing lock on-off command, the vehicle speed limit on-off command, the vehicle speed recovery flag, respectively, to illustrate the operation of the forklift truck of FIG. 1.
Figure 4B:
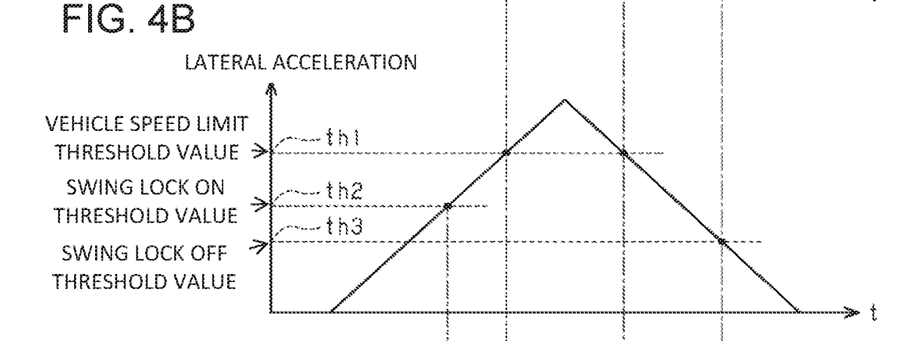
Figures 4C, 4D:
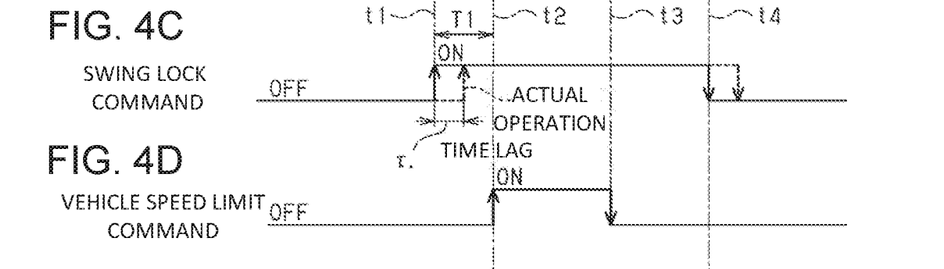

Referring to FIG. 4B, when the vehicle begins to be turned, the lateral acceleration increases. After the lateral acceleration exceeds its maximum value, the lateral acceleration decreases. When the forklift truck 10 is turned, the swing lock command is turned ON to temporally restrict the pivoting of the rear axle 22, as shown in FIG. 4C, and the vehicle speed limit command is turned ON, as shown in FIG. 4D. Referring to FIG. 4A, when the forklift truck 10 is turned, the vehicle speed decreases and then returns to the original vehicle speed.

As shown in FIG. 4B, the lateral acceleration threshold value th1 which is used to judge whether the vehicle traveling speed should be limited is set larger than the lateral acceleration threshold value th2 which is used to judge whether the pivoting of the rear axle 22 should be temporally restricted. The lateral acceleration threshold values th1 which is used to judge whether the vehicle traveling speed should be limited and the lateral acceleration threshold value th2 correspond to the first and second lateral acceleration threshold values of the present invention, respectively. The lateral acceleration threshold value th1 which is used to judge whether the limitation of the vehicle traveling speed should be released is set larger than the lateral acceleration threshold value th3 which is used to judge whether the restriction of the pivoting of the rear axle 22 should be released. The lateral acceleration threshold value th1 which is used to judge whether the limitation of the vehicle traveling speed should be released and the lateral acceleration threshold value th3 correspond to the third and fourth lateral acceleration threshold values of the present invention, respectively. The lateral acceleration threshold value th3 which is used to judge whether temporal restriction of the pivoting of the rear axle 22 should be released is set smaller than the lateral acceleration threshold value th2 which is used to judge whether the pivoting of the rear axle 22 should be temporally restricted.

Figure 4E:
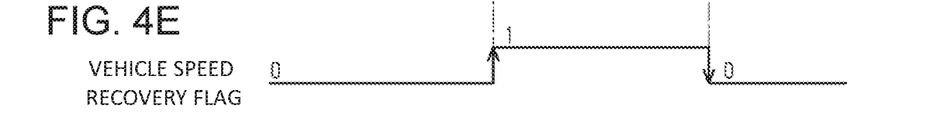
Figure 5:
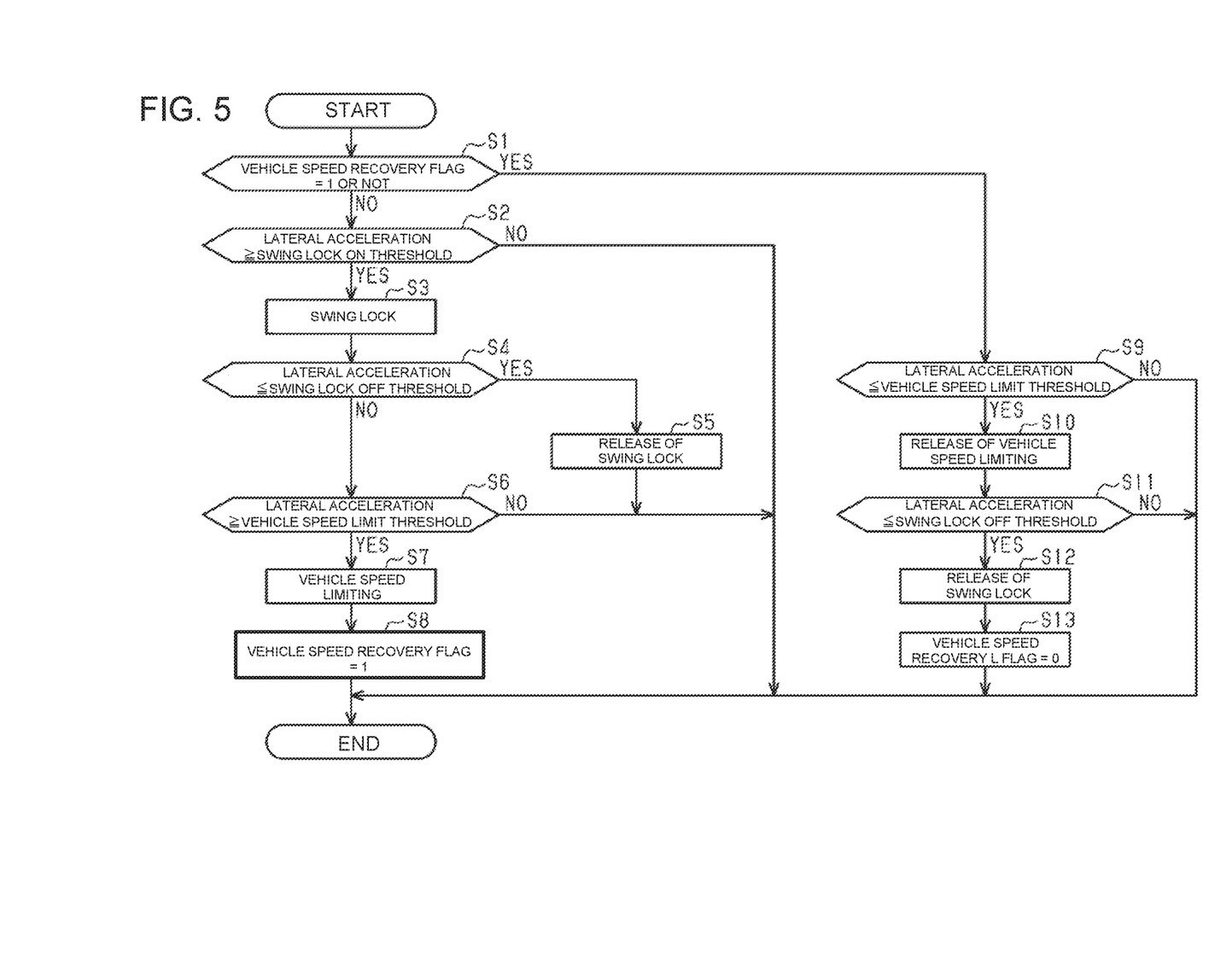
FIG. 5 is a flow chart showing the control process for the operation of the forklift truck of FIG. 1.

Referring to the flow chart of FIG. 5, when the vehicle speed recovery flag is zero at the step S1, the control process proceeds to the step S2, where the controller 35 determines whether the lateral acceleration is at the threshold value th2 for turning ON the swing lock or larger. If NO at the step S2, the controller 35 waits until the lateral acceleration becomes the threshold value th2 for turning ON the swing lock. This processing corresponds to the state before the timing t1 shown in FIGS. 4A through 4E.

When the lateral acceleration becomes the threshold value th2 for turning ON the swing lock or larger at the step S2 (corresponding to the timing t1 shown in FIGS. 4A through 4E), the control process proceeds to the step S3, where the controller 35 controls to energize the solenoid 30 to temporally restrict pivoting of the rear axle 22 while the forklift truck 10 is being turned.

After the controller 35 performed the step S3, the control process proceeds to the step S4, where the controller 35 determines whether the lateral acceleration is at or less than the threshold value th3 for turning OFF the swing lock. If NO at the step S4, the control process proceeds to the step S6, where the controller 35 determines whether the lateral acceleration is at or larger than the threshold value th1 for limiting the vehicle speed. If No at the step S6, the controller 35 repeats to determine whether the lateral acceleration is at or larger the threshold value th1 for limiting the vehicle speed. This processing corresponds to the state between the timing t1 and the timing t2 shown in FIGS. 4A through 4E.

If YES at the step S6, the control process proceeds to the step S7, where the controller 35 controls the traveling motor 43 so as to limit the vehicle speed while the forklift truck 10 is being turned. Accordingly the vehicle speed decreases from the original vehicle speed V1 to the turning speed limit value V2 after passage of a predetermined period ΔT1 so that the turning speed is limited at V2, as shown in FIG. 4A. The turning speed limit value V2 is changed based on the lateral acceleration.

Figure 6:
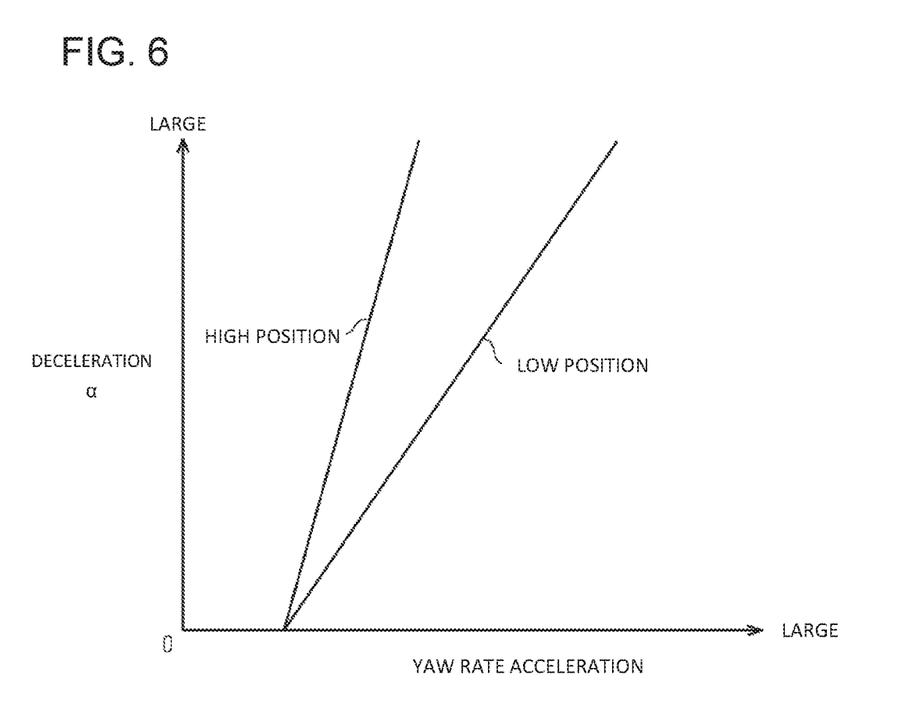
FIG. 6 is a graph showing the relationship between the yaw acceleration and the deceleration in the forklift truck of FIG. 1.
Figure 7A:
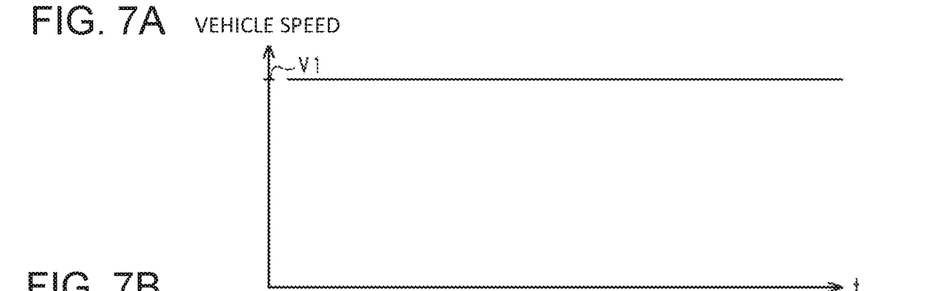
FIGS. 7A, 7B, 7C, 7D, and 7E are various time charts, showing the vehicle speed, the lateral acceleration, the swing lock on-off command, the vehicle speed limit on-off command, and the vehicle speed recovery flag, respectively, to illustrate another manner of operation of the forklift truck of FIG. 1.
Figure 7B:
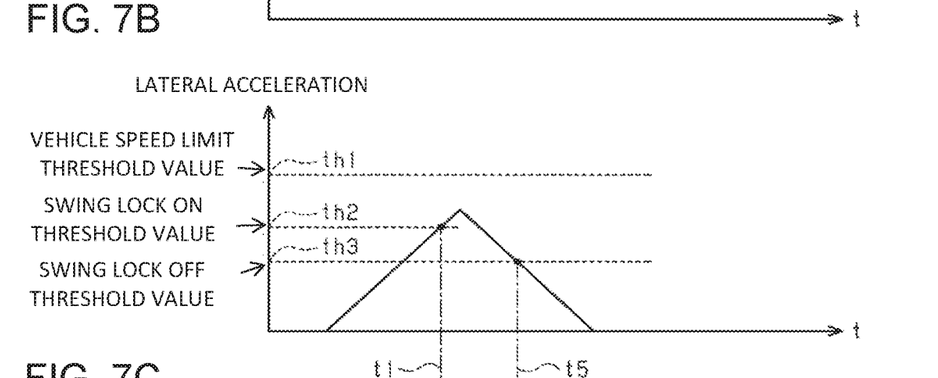
Figures 7C, 7D:
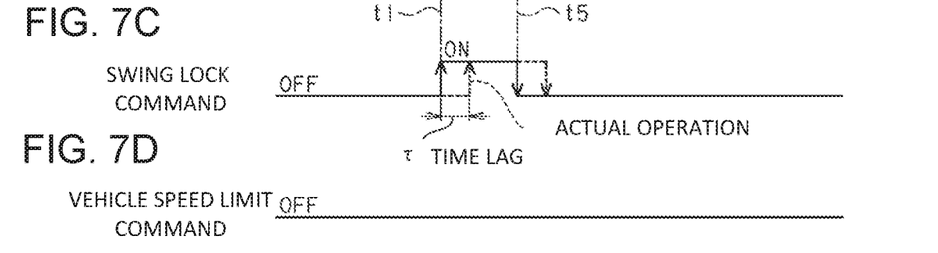
Figure 7E:
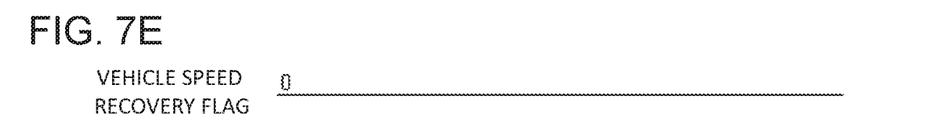
Figure 8A:
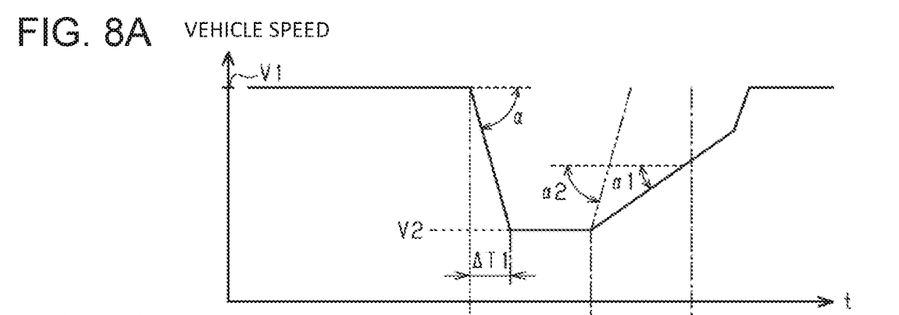
Figure 8B:
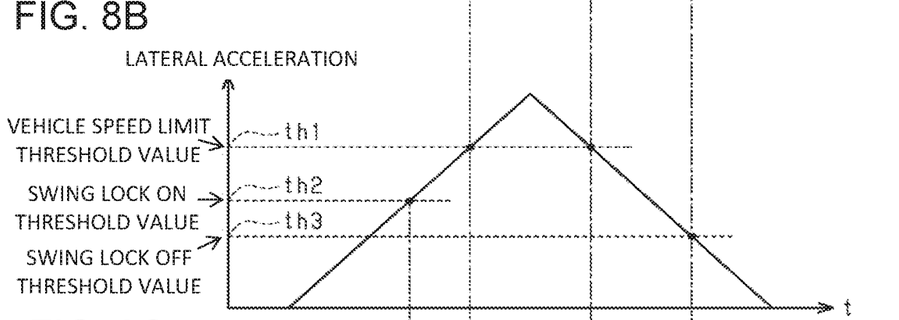
Figures 8C, 8D:
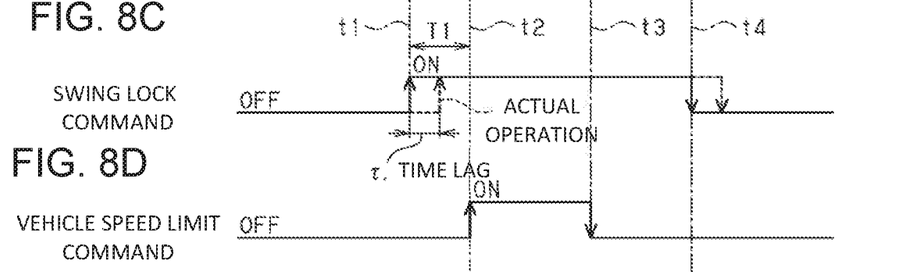
Figure 8E:
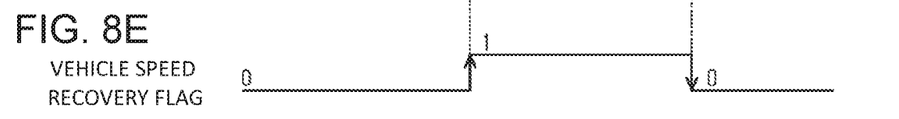
Figure 9A:
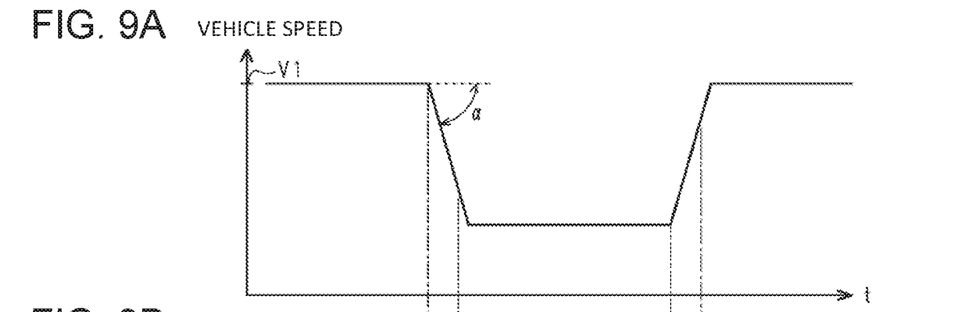
FIGS. 9A, 9B, 9C, and 9D are various time charts, showing the vehicle speed, the lateral acceleration, the vehicle speed limit on-off command, and the swing lock on-off command, and the vehicle speed recovery flag, respectively, to illustrate the operation of the forklift truck of the background art.
Figure 9B:
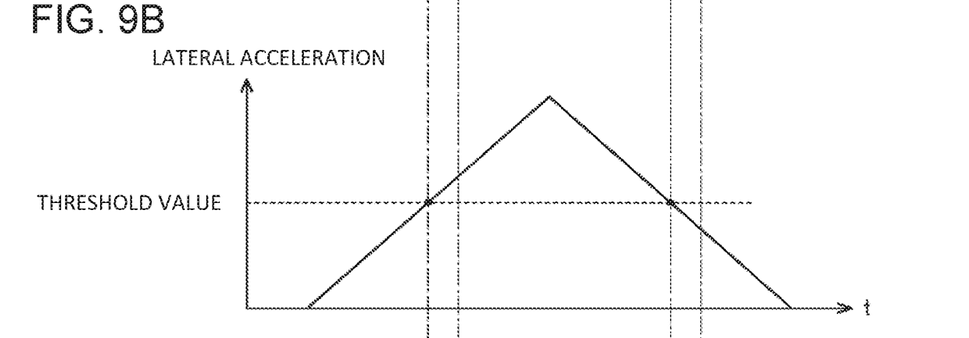
Figure 9C:
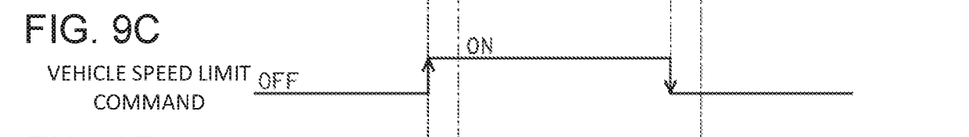
Figure 9D:
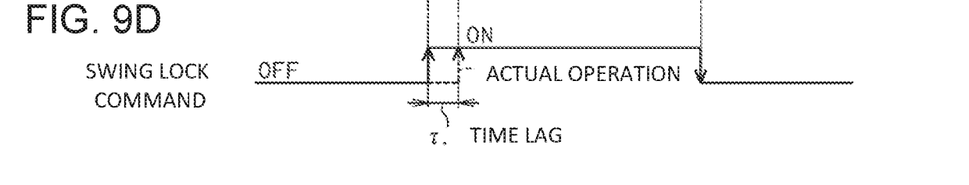

In the controlling to limit the vehicle speed, the controller 35 determines the deceleration a based on the yaw rate acceleration and the fork height position of the fork (low position or high position) as shown in FIG. 6. As appreciated from FIG. 6, the deceleration a is increased with an increase of the yaw rate acceleration and is set larger when the fork position is higher. Thus, in order to increase the stability when the vehicle is steered quickly, the controller 35 increases the deceleration a depending on the yaw rate acceleration so as to decrease the vehicle speed quickly.

After the processing at the step S7, the control process proceeds to the step S8, at which the vehicle speed recovery flag is turned on, or the state of the vehicle speed recovery flag is changed from 0 to 1, as shown in FIG. 4E.

If YES at the step S1, or if the controller 35 judges that the vehicle speed recovery flag is 1 at the step S1, the control process proceeds to the step S9, where the controller 35 determines whether the lateral acceleration is at the threshold value th1 for limiting the vehicle speed or less. If NO at the step S9, the controller repeats to determine whether the lateral acceleration becomes the threshold value th1 for limiting the vehicle speed or less. This processing corresponds to the state between the timing t2 and the timing t3 shown in FIGS. 4A through 4E.

When the controller 35 determines that the lateral acceleration is at the threshold value th1 for limiting the vehicle speed or less at the step S9 (this corresponding to the timing t3 shown in FIGS. 4A through 4E), the control process proceeds to the step S10, where the controller 35 controls the traveling motor 43 to stop the limitation of the vehicle speed while the forklift truck 10 is being turned. By stopping the limitation of the vehicle speed, the vehicle speed is increased from the turning speed limit value V2 to the original vehicle speed V1 as shown in FIG. 4A.

After the step S10 has been performed, the control process proceeds to the step S11, where the controller 35 determines whether the lateral acceleration is at the threshold value th3 for turning OFF the swing lock or less. If NO at the step S11, the controller 35 waits until the lateral acceleration becomes the threshold value th3 for turning OFF the swing lock or less. This processing corresponds to the state between the timing t3 and the timing t4 shown in FIGS. 4A through 4E.

If YES at the step S11 (corresponding to the timing t4 shown in FIGS. 4A through 4E), the control process proceeds to the step S12 and deenergizes the solenoid 30 to stop the temporal restriction of the pivoting of the rear axle 22 while the forklift truck 10 is being turned. As shown in FIGS. 4A through 4E, the increase of the vehicle speed has been stopped at the timing t4.

After the step S12, the control process proceeds to the step S13 and the vehicle speed recovery flag is changed from 1 to 0, as shown in FIG. 4E.

Thus, the controller 35 sets the lateral acceleration threshold value th1 of the vehicle speed limiting function to be a value that is set larger than the lateral acceleration threshold value th2 of the swing lock function. In this case, the time lag T1 between the ON command by the threshold value th1 and the ON command by the value th2 corresponds to the longest response time (time lag τ) of the solenoid 30 to the swing lock ON command. The timing t2 for limiting the vehicle speed of the vehicle speed limiting function occurs behind the timing t1 for turning ON the swing lock of the swing lock function and also after the solenoid 30 is performed and the restriction of the pivoting of the rear axle 22 is completed. Since only the swing lock function is performed at the on timing t1, there occurs no interference between the swing lock control and the vehicle speed limit control. If the limitation of the vehicle speed of the vehicle speed function is performed later, there occurs no interference of the control because the vehicle stability in the lateral direction is already ensured by the swing lock function.

Thus by shifting the timings of the swing lock function and the vehicle speed limiting function relative to each other by T1, thereby to prevent the interference of the control, the vehicle operator is free from uncomfortable feel. Furthermore, for a vehicle operator who is accustomed to the swing lock function, the swing lock function need not be changed and the vehicle speed limiting function may be used as additional function.

Referring to FIGS. 7A, 7B, 7C, 7D, and 7E, when the controller 35 determines at the step S4 that the lateral acceleration is at or less than the threshold value th3 for turning OFF the swing lock (corresponding to the timing t5 shown in FIGS. 7A through 7E), the control process proceeds to the step S5 and the solenoid 30 is deenergized so as to stop the restriction of the pivoting of the rear axle 22 while the forklift truck 10 is being turned. When the lateral acceleration exceeds the threshold value th2 for turning ON the swing lock and then is decreased to the threshold value th3 for turning OFF the swing lock or less without exceeding the threshold value th1 for limiting the vehicle speed, the swing lock is released without limiting the vehicle speed.

The forklift truck 10 according to the present embodiment offers the following advantages.

(1) The forklift truck 10 includes the yaw rate sensor 36, the controller 35, and the solenoid 30 that temporarily restricts the pivoting motion of the rear axle 22 while the forklift truck 10 is being turned. The yaw rate sensor 36 and the controller 35 serving as lateral acceleration sensor of the present invention, determine lateral acceleration applied to the body 11 when the forklift truck 10 is turned. The controller 35 serves as vehicle speed limiter of the present invention that limits the vehicle traveling speed when the forklift truck 10 is turned. The controller 35 serving as controller of the present invention controls the solenoid 30 based on the detected lateral acceleration thereby to temporally restrict the pivoting motion of the rear axle 22 while the forklift truck 10 is being turned (or to restrict the rolling motion of the rear axle 22 relative to the body 11) and limits the vehicle traveling speed based on the lateral acceleration when the forklift truck 10 is turned.

In the controller 35 serving as controller, the lateral acceleration threshold value th1 which is used in judging whether the vehicle traveling speed should be limited is set larger than the lateral acceleration threshold value th2 which is used to in judging whether the pivoting motion of the rear axle 22 should be temporally restricted.

Accordingly, after restricting the pivoting of the rear axle 22, the vehicle traveling speed is limited when the forklift truck 10 is turned. Therefore, the operator of the forklift truck experiences no uncomfortable feel during the turning operation of the forklift truck and the vehicle may be turned smoothly and stably.

The output paths of the swing lock function and the vehicle speed limiting function differ from each other. Therefore, if the swing lock function and the vehicle speed limiting function use the same value of the lateral acceleration, the timings to perform the control differ from each other due to the difference of their output paths. For example, when the limitation of the vehicle speed is performed while the vehicle is turned formerly and the swing lock of the swing lock function is performed afterwards with the body being inclined, the inclination of the body is retained, so that an operator possibly feels strange. According to the present embodiment, however, the problem may be prevented.

(2) In the controller 35 serving as controller of the present invention, the lateral acceleration threshold value th1 which is used in judging whether the limitation of the vehicle traveling speed should be released is set larger than the lateral acceleration threshold value th3 which is used in judging whether the restriction of the pivoting of the rear axle 22 should be released. Such control of the forklift truck is practical.

(3) The lateral acceleration threshold value th3 which is used in judging whether the restriction of the pivoting of the rear axle 22 should be released is set smaller than the lateral acceleration threshold value th2 which is used in judging whether the pivoting of the rear axle 22 should be temporally restricted. Such control of the forklift truck is practical.

The present invention has been described in the context of the present embodiment, but it is not limited to the present embodiment. Although the lateral acceleration is calculated based on the yaw rate measured by the yaw rate sensor, the lateral acceleration may be calculated based on the wheel turning angle measured by a wheel turning angle sensor, specifically, the turning radius that is determined by the wheel turning angle, and the vehicle speed measured by a vehicle speed sensor. The forklift truck may include a yaw rate sensor, a wheel turning angle sensor, and a vehicle speed sensor.

The forklift truck 10 may be configured so that the operator selects the application of the vehicle speed limiting function. For the purpose, an operation panel (a display) mounted on the forklift truck 10 may have a menu that allows the operator to select ON/OFF of the function. For example, the operator who desires to use the limitation of the vehicle speed positively may select ON of the function because the use of only the vehicle speed limiting function can stabilize the forklift truck 10 in the lateral direction. An operator who is accustomed to the use of only the swing lock function may feel that the limitation of the vehicle speed by the vehicle speed limiting function is troublesome function that restricts the performance of the vehicle. In such a case, the function may be set OFF.

Referring to FIGS. 8A through 8E, the upper limit value $\alpha 1$ may be set for the vehicle speed acceleration after the timing t3. The upper limit value $\alpha 1$ may be set a value that is set smaller than the value $\alpha 2$ which is used for control when no upper limit for the acceleration is set so as to allow the vehicle to accelerate moderately.

As shown in FIG. 4B, the threshold value th1 is used as the lateral acceleration threshold value which is used in judging whether the vehicle traveling speed should be limited and also as the lateral acceleration threshold value which is used in judging whether the limitation of the vehicle traveling speed should be released. Alternatively, the threshold value which is used in judging whether the vehicle traveling speed should be limited may differ from the threshold value which is used in judging whether the limitation of the vehicle traveling speed should be released.

The forklift truck 10 may be configured so that an operator changes threshold values. For the purpose, an operation panel (display) mounted on the forklift truck 10 may have a menu that allows the vehicle operator to change threshold values. For example, when the stability in the lateral direction is improved by the use of only the swing lock function, the forklift truck 10 may be configured so that the turning vehicle speed limiting value is set to a value corresponding to a further increased lateral acceleration threshold value. When the operator who is accustomed to the use of only the swing lock function desires to limit the vehicle speed at a faster speed in the vehicle speed limiting function so that the forklift truck travels stably, the function may be used. Since the vehicle speed limiting depends on the operator's preference, tuning may be available. For example, it may be so configured that a plurality of values is set for the vehicle speed limitation and the vehicle operator is allowed to select a desired value.

The forklift truck 10 is not limited to a forklift truck having the fork 14 to carry loads, but may be a forklift truck having various attachments including such as a hinged fork, a clamp, and a ram.

The industrial vehicle is not limited to a forklift truck, but it may be other industrial vehicle of other type in which the axle is pivotally supported by the body such as a shovel loader.

What is claimed is:

1. An industrial vehicle comprising:
a body including a rear axle support member;
a rear axle pivotally supported by the rear axle support member of the body, wherein the rear axle includes a rocking shaft and opposite ends of the rear axle support steerable rear wheels that are swingable up and down with respect to the body by a pivoting movement of the rear axle via the rocking shaft;
a lateral acceleration sensor determining lateral acceleration applied to the body when the industrial vehicle is turned;
an actuator temporally restricting the pivoting movement of the rear axle via the rocking shaft while the industrial vehicle is being turned;
a vehicle speed limiter limiting traveling speed of the industrial vehicle when the industrial vehicle is turned; and
a controller configured to:
drive the actuator to temporally restrict the pivoting movement of the rear axle via the rocking shaft, so that the rear wheels are prevented from swinging up and down, based on the lateral acceleration determined by the lateral acceleration sensor being higher than a second lateral acceleration threshold value while the industrial vehicle is being turned,
control the vehicle speed limiter to limit the traveling speed of the industrial vehicle based on the lateral acceleration being higher than a first lateral acceleration threshold value when the industrial vehicle is turned,
wherein, the actuator is a solenoid, and the first lateral acceleration threshold value is larger than the second lateral acceleration threshold value, and a difference between the first lateral acceleration threshold value and the second lateral acceleration threshold value is set based on a response time of the solenoid, wherein the response time is an amount of time to operate the solenoid to restrict the pivoting movement of the rear axle, and
limit the traveling speed of the industrial vehicle after a predetermined period of time from restriction of the pivoting movement of the rear axle during turning of the industrial vehicle.

2. The industrial vehicle according to claim 1, wherein in the controller, a third lateral acceleration threshold value which is used in judging whether limitation of the traveling speed should be released is set larger than a fourth lateral acceleration threshold value which is used in judging whether the restriction of the pivoting movement of the rear axle should be released.

3. The industrial vehicle according to claim 2, wherein in the controller, the fourth lateral acceleration threshold value which is used in judging whether the restriction of the pivoting movement of the rear axle should be released is set smaller than the second lateral acceleration threshold value which is used in judging whether the pivoting movement of the rear axle should be temporally restricted.

4. The industrial vehicle according to claim 1, wherein the controller controls a traveling motor to limit the speed of the industrial vehicle.

* * * * *